Nov. 6, 1956
C. O. LARSON
2,769,606
ANCHORAGE DEVICE
Filed April 13, 1951
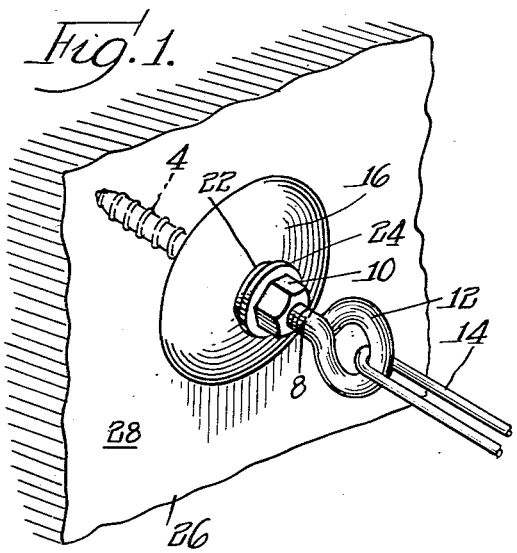
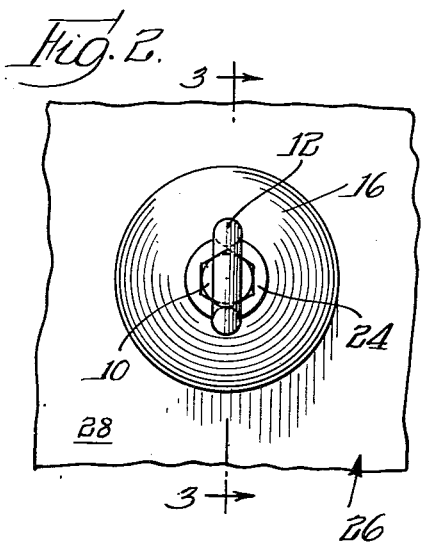
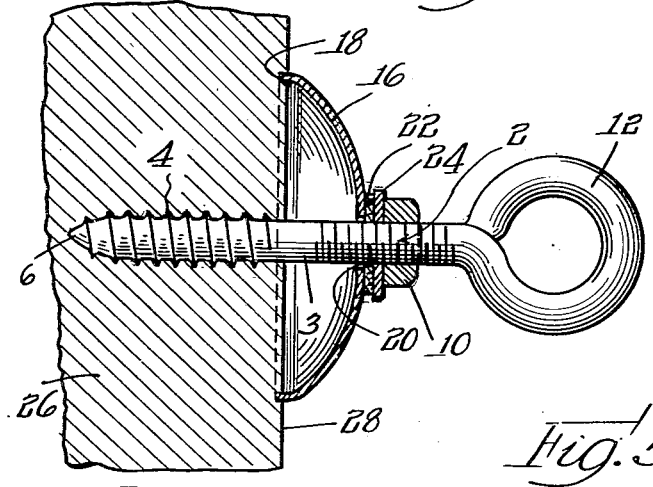
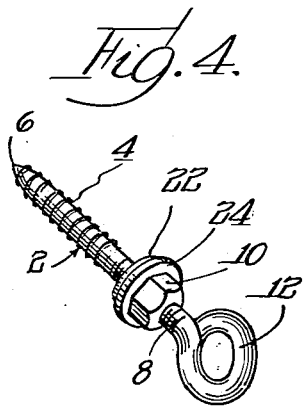
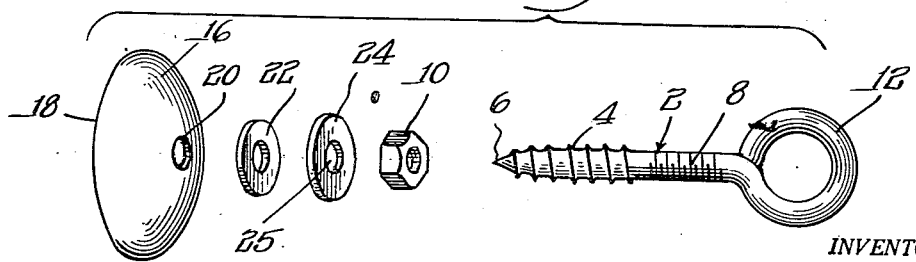
INVENTOR.
Charles O. Larson
BY
Moore, Olson & Trexler
attys

United States Patent Office 2,769,606
Patented Nov. 6, 1956

2,769,606
ANCHORAGE DEVICE
Charles O. Larson, Sterling, Ill.

Application April 13, 1951, Serial No. 220,880

3 Claims. (Cl. 248—71)

This invention relates to anchorage devices, such for instance as lag screw eye or hook devices, and in particular relates to a lag screw eye or hook device for fastening television aerials on roofs.

Among the objects of the present invention is to provide an anchorage device in the form of a lag screw for fastening television aerials on roofs, the lag screw being constructed and arranged to include a wood screw portion adapted to be screwed into a wooden support. The lag screw includes also a standard machine thread upon the shank of the screw adapted to receive a cupped washer and a standard nut together preferably with a sealing washer, which nut and sealing washer engage the standard machine thread of the shank of the lag screw whereby adjustably to secure the cupped washer about the shank of the lag screw with the circular periphery of the cupped washer pressing tightly against or embedded in the surface of the wooden support into which the pointed and wood screw threaded end of the lag screw is embedded. In this manner the cupped washer surrounding the shank of the lag screw operates to render the assembly waterproof, prevents moisture from entering the hole into which the pointed end of the lag screw is embedded, and also operates to brace the outer end of the lag screw to prevent it either being pulled out or being pulled sidewise.

These and other objects of the invention will be apparent from a perusal of the following specification when taken in connection with the accompanying drawings wherein:

Fig. 1 is a perspective view of one form of the improved lag screw showing the same attached or embedded into a wooden support and having a cable or wire attached to the eye of the lag screw running to an aerial on a roof for supporting the same;

Fig. 2 is a top view of Fig. 1;

Fig. 3 is a sectional view substantially as seen in the direction of the arrows along the line 3—3 of Fig. 2;

Fig. 4 is a perspective view of the screw without the cupped washer and separated from its anchorage; and Fig. 5 is an exploded view showing the details of the lag screw and the cupped washer, sealing washer, a lock washer and the nut which are received upon the standard machine threaded portion of the lag screw.

The invention herein is adaptable for use in connection with any type of lag screw having an upper end either of a special formation such as in the form of an eye or a hook or any other equivalent construction. More specifically, the lag screw comprises a relatively long shank portion 2 having a wood screw type of thread on its shank portion 4 with the extremity of this shank portion pointed as at 6. In addition, beyond the termination of the wood screw type of thread 4 the shank of the screw is provided with a standard machine thread for receiving a nut. This standard machine thread is indicated as at 8 to receive thereon a standard nut 10. By making the shank of any desired diameter, any desired diameter of threaded portion 8 or any diameter of nut 10 may be utilized. The outer end of the shank portion 2 is provided with either an eye such as 12 or may be provided with a hook portion or may be provided with any other equivalent fixture at the outer end for the purpose of receiving an anchorage member such as the cable 14 shown in Fig. 1.

In addition, there is provided a cup shaped washer 16 having a circular periphery 18 and having a central hole or opening 20 of desired diameter and specifically a diameter to fit substantially snugly more or less about the shank portion 2 of the lag screw. In addition, the invention comprehends the utilization of a sealing washer 22 and a lock washer 24 if desired, for preventing inadvertent turning of the nut 10 with respect to the shank. If desired the lock washer 24 may be a simple washer of the non-locking type.

In the assembly of the device, the cup shaped washer is placed on the upper shank portion 2 of the lag screw, with the nut 10 threaded toward the eye 12 on threaded portion 8 whereby to permit the cup shaped washer 16, the sealing washer 22 and the lock washer 24 to occupy a position toward eye 12 about the threaded shank portion 9 of the lag screw. Thereafter the lag screw is started into the wooden base or support 26 until it is screwed home a sufficient amount to remain rigid and secure. After this the cup shaped washer 16 is then moved to position to slightly bite into the face 28 of the support 26 and then the lock washer 24 and sealing washer 22 are moved down to cover the opening 20 in the cup shaped washer 16; then the nut 10 is threaded tightly home to press the washers 22 and 24 against the opening 20 in the cup shaped washer 16 and to press the periphery 18 of the cup-shaped washer 16 against and into the face of support 26. The cable 14 or other member running over to the aerial for anchorage purposes may be affixed to the eye portion 12 of the lag screw either before or after the lag screw is embedded in its wooden support 26.

From the foregoing it will be seen by means of the present construction the cup shaped washer 16 forms a waterproof cover for the shank of the lag screw, preventing moisture from getting into the surface of the wood around the shank of the lag screw, or at the surface where the circular periphery 18 of the cup shaped washer is embedded in the support 26. In addition, the cup shaped washer by means of its convex surface spaced from the periphery 18 provides a widened support for the outer end of the lag screw, thereby tending to prevent the lag screw from being pulled sidewise. Thus, to eliminate the hazard of the screw eye working loose, the present invention includes the cover portion consisting of the dished washer 16 sealingly to make this fastening member waterproof on the roof as well as to increase the bracing so that it will not work loose in the wood.

The thread 4 is preferably formed by rolling and is preferably accomplished after the standard machine cut thread 8 (see Fig. 5) is formed and after the nut 10 is threaded onto the thread 8 of the shank 2. Since the rolled thread 4 is of larger diameter than the unthreaded shank portion 3, the rolled threads 4 retain the nut 10 on the shank between the headed eye 12 or hook and the rolled thread 4.

In practice the diameter of the hole 20 of the dished washer 16 is formed only slightly larger than the diameter of the rolled thread 4 so that the dished washer tends to be retained on the shank but can be removed by unscrewing the washer 16 from the thread 4.

So also the metal washer 24 may have its opening 25 formed so that this washer is locked on the shank by the eye 12 and the thread 4. Or it may be formed slightly larger than the diameter of thread 4 so as to be removed by unscrewing it, or it may be formed to slide freely off threaded shank 4.

In some instances it is proposed to form the opening 20 of the dished washer 16 of a diameter smaller than the diameter of the rolled-thread 4 so that this washer 16 and the washers 22 and 24 and nut 10 are all locked on shank 3 as a complete assembly.

This may be accomplished by forming the thread 8 and the thread 4, thereafter assembling the cupped washer 16, washers 22 and 24 and nut 10 on the shank, and then forming the straight end of the opposite end of the shank into an eye 12, or by rolling the thread 4 as a last operation after the washers 16, 22 and 24 and nut 10 have been assembled on the shank which has had the eye 12 formed thereon. Both thread 4 and eye 12 may be formed after the thread 8 has been formed and the washers 16, 22 and 24 and nut 10 have been assembled on the shank.

By means of the foregoing a product may be formed for sale as an organized assembly carrying the washers and nut or one or more of the washers and nut or only the nut irremovably locked on the shank between the eye 12 and the rolled thread 4.

Having thus described the invention, what is claimed as new is:

1. An anchorage device adapted to be installed on a wood-like support having a substantially smooth support surface comprising a lag screw, one end of said lag screw having formed thereon a wood screw portion adapted to be screwed into the wood-like support with the axis thereof substantially perpendicular to the support surface, the other end of said lag screw having an eye formed thereon and spaced from said wood screw portion, machine threads formed on said lag screw between said wood screw portion and said eye, a cup-shaped washer having an aperture in the center thereof receiving said lag screw, the free edge of said cup-shaped washer being directed toward said wood screw portion and the associated support surface, said free edge being substantially circular in shape and having a diameter many times the diameter of said lag screw, a nut threaded upon said machine threads between said eye and said cup-shaped washer, a lock washer positioned between said nut and said cup-shaped washer, and a sealing washer positioned between said lock washer and said cup-shaped washer, said nut when turned upon said machine threads toward said washers urging the free edge of said cup-shaped washer against and into the associated support surface, said cup shaped washer and sealing washer in cooperation with said lag screw and said nut providing a seal around the point at which said wood screw portion enters the associated support, the relatively large diameter of the free edge of said cup-shaped washer as compared with the diameter of said lag screw providing good lateral support for said lag screw, said cup-shaped washer in cooperation with said nut and lock washer locking said lag screw against turning with respect to the associated support.

2. An anchorage device as set forth in claim 1, wherein the outer diameter of the wood-screw portion and the greatest dimension of the eye in a direction perpendicular to the axis of the lag screw being greater than the diameter of the apertures in the cup washer, the lock washer, the sealing washer and the nut to trap said washers and said nut on said lag screw between said wood screw portion and said eye.

3. An anchorage device adapted to be installed on a wood-like support having a substantially smooth support surface comprising a lag screw, one end of said lag screw having formed thereon a wood screw portion adapted to be screwed into the wood-like support with the axis thereof substantially perpendicular to the support surface, the other end of said lag screw having an attachment member formed thereon and spaced from said wood screw portion, machine threads formed on said lag screw between said wood screw portion and said attachment member, a cup-shaped washer having an aperture in the center thereof receiving said lag screw, the free edge of said cup-shaped washer being directed toward said wood screw portion and the associated support surface, a nut threaded upon said machine threads between said attachment member and said cup-shaped washer, a lock washer mounted upon said lag screw between said nut and said cup-shaped washer, a sealing washer mounted upon said lag screw between said lock washer and said cup-shaped washer, said nut when turned upon said machine threads toward said cup-shaped washer urging the free edge of said cup-shaped washer against and into the associated support surface, said cup-shaped washer and nut and lock washer and sealing washer in cooperation with said lag screw providing a seal around the point at which said wood screw portion enters the associated support, said cup-shaped washer providing lateral support for said lag screw and in cooperation with said nut locking said lag screw against turning with respect to the associated support.

References Cited in the file of this patent

UNITED STATES PATENTS

| 316,650 | Perkins | Apr. 28, 1885 |
|---|---|---|
| 462,777 | Roth | Nov. 10, 1891 |
| 798,732 | Kamin | Sept. 5, 1905 |
| 1,126,531 | Liebmann | Jan. 26, 1915 |
| 1,250,597 | Kyle | Dec. 18, 1917 |
| 1,335,756 | Scarff | Apr. 6, 1920 |
| 1,719,136 | Rosenberg | July 2, 1929 |
| 2,113,425 | Crowther | Apr. 5, 1938 |
| 2,311,299 | Olson | Feb. 16, 1943 |
| 2,334,406 | Gray | Nov. 16, 1943 |

FOREIGN PATENTS

| 15,769 | Great Britain | July 15, 1904 |